United States Patent Office 3,558,418
Patented Jan. 26, 1971

3,558,418
BLOCKING-RESISTANT PLASTICIZER ARTICLES, COMPOSITIONS AND PROCESSES
Erland C. Porter, Jr., Dayton, Ohio, and Hans F. Huber, Wiesloch, Germany, assignors to The National Cash Register Company, Dayton, Ohio, a corporation of Maryland
No Drawing. Filed May 22, 1968, Ser. No. 731,265
Int. Cl. B32b 5/16, 5/30
U.S. Cl. 161—162                                      24 Claims

ABSTRACT OF THE DISCLOSURE

This disclosure is directed to (1) blocking-resistant, particulate, tackifying plasticizer solids, each having a randomly-shaped solid core of tackifying plasticizer, and a substantially continuous, solid-retaining, comparatively hard covering of higher melting polymeric material; (2) heat-activatable plasticized thermoplastic adhesives containing a profusion of individually covered plasticizer solids distributed uniformly therein; (3) articles of manufacture, e.g., prepasted wallpaper and wall coverings, containing said adhesive coated, impregnated, joined, secured, or otherwise applied to a suitable substrate material, e.g., conventional wallpaper base stock (prefilled or unfilled), conventional washable wall covering material (plasticized polyvinyl chloride deposited on and/or into the viewed side of the cloth); (4) processes for making the blocking-resistant, particulate, tackifying plasticizer solids; (5) processes for making articles (3); (6) processes for applying prepasted articles (3) to a base(s), e.g., walls of plaster, conventional gypsum dry-wall, wood, etc.; and (7) composite articles of manufacture comprising a base to be covered, decorated, protected, etc., with the articles (3) adhered or otherwise secured thereto, e.g., prewallpapered decorative panelling where the wallpaper on the adjacent base panels is prematched, permanent or semipermanent records, e.g., comprised of paper containing printed matter or indicia which is preserved by lamination with a protective film, layer or sheet using the heat sealable adhesive (2) as the laminant.

---

While a representative concentration of the plasticizer solids (1) are of random shape, the predominant shape is generally spherical as observed through the electron microscope at magnifications of 48,000+ times. Each covered plasticizer particle (1) was observed to have a continuous "bumpy" covering ranging in thickness from about 0.02 to about 20 microns. The "bumps" or protuberances (surface projections of general rounded shape) appeared as a part of the covering and ranged in size from about 0.01 to about 1.0 micron with the thicker coverings having the larger bumps and vice versa, as gleaned from electron photomicrographs.

The substantially continuous covering is comprised of polymeric material having a melting range, the threshold temperature of which is higher than the melting range (thermal activation temperature) of said tackifying plasticizer, said tackifying plasticizer solids characterized by being in a nontacky, blocking-resistant form at ambient temperatures due to inhibition of the cold-flowing tendency provided by said continuous covering. Hence, each individual plasticizer particle (core) has its own continuous covering. The thermoplastic adhesives (2) are heat-sealable, thermoplastic adhesive compositions which are rendered nontacky and resistant to blocking at ambient temperatures due to the presence of a profusion of uniformly distributed continuously covered plasticizer solids (1) described above.

Since the covering material has a melting range, the threshold temperature at which the covering material begins to melt) of which is higher than the thermal activation temperature of the thermoplastic adhesive; the tackifying plasticizer "core" melts and is able to egress through the liquid-porous covering upon thermal activation of said adhesive composition (viz, the thermoplastic adhesive and the tackifying plasticizer), thereby uniformly imparting increased tack to said adhesive. At temperatures below thermal activation temperature the covering restricts access of the solid plasticizer cores to the thermoplastic adhesive matrix because the covering is solids-retaining. This inhibits the cold-flowing tendency of said tackifying plasticizer solids and preserves a nontacky, blocking-resistant condition at most ambient room and storage temperatures.

Another advantage attendant to the adhesives of this invention is that they are readily strippable, viz, the thermoplastic adhesives can be mobilized thus allowing moving or removal of the substrate due to the heat liquefying the adhesive bond. Hence, when the adhesive are prepasted on wall covering, e.g., wallpaper, substrates; the products are prepasted thermally strippable wall coverings. Since heat is the agency used to place the adhesive in strippable condition, the stripping operation is neat, efficient, inexpensive and saves considerable time compared to the laborious wetting and scraping removal technique used with conventional wallpapers and coverings. The same device used to activate the adhesive thermally and apply the wallpaper substrate can be used to strip the substrate; and, in general, the same temperatures prevail for stripping as for application.

Heat sealing thermoplastic adhesive compositions have enjoyed widespread usage. Such compositions are usually comprised of one or more compatible thermoplastic resins with one, or a mixture of, plasticizer(s), and optional adjuvant materials such as fillers, coloring agents, etc., to assist in tailor-making the adhesives to suit specific end uses. Plasticizers are employed in the thermoplastic heat sealing compositions to increase their tackiness so as to enable adhesive films to attain their full adhesive power when the heat is applied to them.

The inclusion of plasticizers in the thermoplastic adhesives has created certain problems, however. One of the problems is that the plasticizers which are frequently best with respect to increasing the tackifying properties of these heat sealable thermoplastic adhesives films, also unfortunately tend to be very cold-flowable, viz, these plasticizers tend to "flow" or migrate through the plastic film at ambient room temperature and storage conditions. This cold-flowing in turn results in premature local activation or an increase in surface tackiness of the thermoplastic films. This undesirable plasticizer migration causes the films to "block" or adhere to one another or the substrates upon which the film is deposited, e.g., when a plurality of thermoplastic adhesive-coated substrate sheets are stacked one upon another, or when the adhesive coated substrate is rolled, e.g., as occurs in rolls of coated (prepasted) wallpaper, plastic wall covering, plastic film, etc. The problem of blocking or premature activation of the thermoplastic adhesives is an expensive one, since it occurs most frequently after preparation of the final coated article has occurred, e.g., during storage thereof but prior to use, e.g., application of the thermoplastic-coated substrate to the base for which it is intended. Consequently, the blocking problem has led to the wasteful and expensive discarding of large amounts of thermoplastic-coated substrate materials.

One possible solution to this problem is to significantly reduce the amount of plasticizer incorporated into the heat sealable thermoplastic adhesive composition. This approach is not really feasible, however, since the adhesive then possesses less than the desired extent of adhesive power to join the substrate (upon which it is deposited) to the base to which the substrate is to be adhered. Hence, the development of a thermoplastic adhesive having balanced properties of strong adhesive power combined with good resistance to blocking at ambient room transportation and storage temperatures has long been desired.

Another attempted prior art solution to the problem of blocking in thermoplastic heat sealable adhesive compositions is the approach contained in U.S. Pat. 2,613,191. This approach renders thermoplastic heat sealable compositions resistant to blocking by formation of solid matrices of polyvinyl alcohol or similar emulsifying agent about solid particles of plasticizer, the polyvinyl alcohol providing a matrix-coating in which the solidified plasticizer particles are restrictively contained. Then upon heating the thermoplastic adhesive to its thermal activation temperature, the polyvinyl alcohol matrix (containing many solid plasticizer particles) melts to assist in rendering the thermoplastic adhesive tacky. When the approach in U.S. Pat. 2,613,191 does render the plasticized thermoplastic adhesive resistant to blocking; the restricted spatial access of the individual solidified plasticizer particles to the thermoplastic adhesive detracts somewhat from the overall adhesive power probably due to the fact that a plurality of plasticizer particles are present in each polyvinyl alcohol matrix.

The present invention constitutes a marked improvement in thermoplastic heat-sealable adhesives because it enables the attainment of thermoplastic adhesive compositions which are not only highly resistant to blocking at ambient temperatures, but also possess strong adhesive power upon thermal activation thereof.

The present invention, by providing each plasticizer solid particle as a core with its own adherent covering spatially separates each of the normally cold-flowable tackifying plasticizer solids from the surrounding matrix of thermoplastic adhesive thereby inhibiting the blocking which results from cold flow at ambient temperature conditions. Since the covering is very thin, however, the restriction to access of the plasticizer to the thermoplastic resins does not detract significantly from the adhesive power of the adhesive upon thermal activation thereof. In other words each covering has the effect of retaining its plasticizer core from migratory cold flow movement at ambient temperature conditions, but upon thermal activation of the thermoplastic adhesive, the plasticizer core melts and then migrates uniformly throughout the thermoplastic adhesive since it has the ability to readily egress from the previously restrictive covering. Since the polymeric material of which the covering is comprised has a higher melting point than that of both the plasticizer particles and the thermoplastic resin(s); the coverings for each plasticizer core can remain as solids upon thermal activation of the thermoplastic adhesive. Of course, it is also within the purview of this invention to formulate the covering of materials which will also melt during thermal activation of the thermoplastic resin(s). In such cases, the covering then becomes a portion of the total thermoplastic adhesive, e.g., as a filler, adhesive component, etc., upon thermal activation of the adhesive.

The present invention constitutes a marked departure from the approach of U.S. Pat. 2,613,191. As noted above, said patent envelops many individual solid plasticizer particles (cores) within each polyvinyl alcohol localized matrix with said matrices being enveloped in turn by the thermoplastic resin matrix. According to the present invention a separate continuous covering is secured about each individual plasticizer particle (core), thereby allowing more uniform distribution of said plasticizer particles in, and greater access to, the matrix of thermoplastic resin during thermal activation of the adhesive. Comparatively speaking, the structure involved in the plasticized thermoplastic adhesive of U.S. Pat. 2,613,191 involves a double matrix, viz, many, individual solid particulate plasticizer particulate cores coated or enveloped completely in each matrix of polyvinyl alcohol, with many of such matrices being present in the overall thermoplastic adhesive matrix.

PLASTICIZERS

While a single highly tackifying plasticizer can be employed, frequently it is desirable to employ more than one plasticizer to attain the tailor-made plasticizing properties desired for a given thermoplastic heat sealable adhesive. Thus, in accordance with this invention, one or more or all of such plasticizers can be provided with liquid-porous, solid-retaining coverings. Frequently, in the combined interests of economy and to enhance the adhesive power of given thermoplastic adhesive compositions, it is desirable to provide only the plasticizer(s) having the greater and more problematic cold flowing tendencies with the individual coverings. Any plasticizer can be employed which enhances the adhesive power during the thermal activation of the thermoplastic adhesive so long as the plasticizer is a solid at ambient temperatures and for all practical purposes substantially insoluble in water. The expression "ambient temperatures" as used herein is with reference to temperatures approximating those normally found in rooms in buildings, storage facilities, and transportation facilities in moderate to warm climates. Of course plasticizers can also be employed which are solids at such temperatures and temperatures below them. Of course, individual plasticizers have different melting points (or more realistically speaking melting ranges), and the lower melting plasticizers can be rendered blocking resistant by the present invention at storage and transportation temperatures which are normally encountered in moderate climates, viz, temperatures up to about 100° F.; yet these plasticizers may "bleed" somewhat in warm to very warm climates. Nevertheless, the present invention enhances the resistance of such plasticizers to blocking compared to compositions wherein the solid plasticizer particles are not individually or otherwise covered.

Suitable plasticizers which are both water-insoluble and solid at ambient temperatures and which can be employed in accordance with this invention include, but are not limited to, the following: hydroabietyl alcohol, triethylene glycol dibenzoate; benzophenone; chlorinated biphenyls; chlorinated polphenyls, e.g., those having specific gravities at 25° C. ranging from about 1.670 to 1.734; mixtures of meta and para terphenyls, e.g., such as the commercially available plasticizer mixtures sold by Monsanto Company under the trade designation "Santowax M & P"; aryl sulfonamide-formaldehyde resin plasticizers, e.g., the commercially available "Santolite MHP" plasticizer of Monsanto Company; tricyclohexyl citrate; diphenoxyethyl fumarate; 2-butoxyethyl pelargonate; triphenyl phosphate; tri(p-tertiary butyl)phenyl phosphate; tri(dichloro)phenyl phosphate; dihexyl phthalate (n- and iso-); dihydrobiethyl phthalate; dicyclohexyl phthalate; diphenyl phthalate; diethoxyethyl phthalate; 1,2-propylene glycol monostearate; glycol monostearate; diethylene glycol distearate; tetraethylene glycol monostearate; tetraethylene glycol distearate; sucrose octaacetate; ortho- and para-toluene sulfonamides; N-ethyl para-toluene sulfonamides; N-cyclohexyl para-toluene sulfonamides; diphenyl phosphate; indene resin plasticizers, e.g., those materials commercially available under the trade designation "Neoindine R-3"; rosin ester plasticizers, e.g., the commercially available glycol ester of rosin acid referred to by the trade designation "Staybelite Ester Number 10"; terpene-phenolic resin plasticizers, e.g., those commercially available materials referred to by the trade designations "SP 533" and "SP 560"; polystyrene plasticizing resins having specific gravities at 25° C. ranging from about 1.02 to 1.07 and having melting points of about 30° C. and higher, e.g., the commercially available "Piccolastic" and "Piccotex" polystyrene plasticizers, etc. Further information concerning the physical properties and compatibility of the above-mentioned plasticizers with conventionally employed, commercially available thermoplastic resins can be found in the article entitled "Plasticizers" by J. T. Freeze (1965). Modern Plastics Encyclopedia, pages 352 to 380, the disclosure of said article being incorporated herein by reference. It will be observed that the above-mentioned suitable exemplary plasticizers represent a wide variety of chemical categories. This should illustrate the fact that so long as the plasticizer material is substantially insoluble in water (so as to enable the individual covering to be applied thereto) and has a melting point sufficiently high to enable it to maintain its solidity at the ambient temperatures encountered, such plasticizer(s) can be provided with individual coverings to enhance their resistance to blocking. Of course, in any given thermoplastic adhesive compositions a plasticizer(s) will usually be employed which is substantially compatible with the thermoplastic resin(s) with which it is to be employed. Hence, the parameters for determining suitability of any given, specific plasticizer are more oriented toward certain of its physical properties than toward the chemical family to which the material belongs.

Since, as noted above, a plurality of plasticizers can be, and often are, used to render the thermoplastic resin(s) adhesive and tacky at the thermal activation temperatures; it is within the purview of this invention to employ comparatively minor amounts of a plasticizer which is partially incompatible with the thermoplastic resin adhesive so long as the composite plasticizer exhibits adequate compatibility. In other words, minor amounts of a comparatively incompatible plasticizer(s) can be used in combination with another resin-compatible plasticizer(s), the important thing being that the composite plasticizer behavior being one of compatibility with the thermoplastic resin adhesive.

INDIVIDUAL COVERING MATERIALS

The polymeric material employed to form the covering must have a melting point, the threshold temperature of which is higher than the melting range of both the thermoplastic resin adhesive(s), which constitute the predominate portion of the heat-sealable adhesive formulation, and the selected plasticizer(s) which imparts to said adhesive its tackifying properties at the temperatures of thermal activation. Any polymer material which is water-insoluble and has a higher threshold melting temperature than both the plasticizer and thermoplastic adhesive can be used as the covering material so long as it is capable of coagulation about the solid plasticizer core particles. For example, latex and/or resin emulsions containing the polymer(s) in particulate solid form so as to enable them to be coagulated, precipitated or otherwise deposited upon the plasticizer core particles are used. These latices are deposited by heated, addition of precipitating ions (salts), addition of nonsolvents, or a combination thereof.

The term "threshold temperature" as used herein is intended to indicate the lower temperature at which the thermoplastic adhesive and plasticizer(s) begins to melt within its "melting range." The term "melting range" is intended to have its usual meaning, viz, the range of temperatures over which the room temperature solid thermoplastic adhesive and plasticizer(s) change from solids to liquids, viz, the temperature range over which they "melt."

Suitable water-insoluble, polymeric covering materials which can be employed in accordance with this invention include, but are not limited to, the following water-insoluble polymers and resins: polyvinyl acetate homopolymers and copolymers, e.g., copolymers containing a major amount of vinyl acetate with a minor amount of methyl or ethyl acrylate; polyvinyl chloride homopolymers and copolymers, e.g., copolymers containing the same or a major amount of vinyl chloride with the same or a minor amount of vinyl acetate; copolymers of alkyl esters of dicarboxylic acids, e.g., dibutyl maleate, with vinyl monomers, e.g., vinyl acetate; acetoxylated polyalkylenes, e.g., copolymers of ethylene, propylene, butenes with vinyl acetate; vinyl chloride-alkyl acrylate copolymers, e.g., with $C_1$ to $C_4$ alkyl acrylate and methacrylates, such as, methyl acrylate, ethyl acrylate, methyl methacrylate; vinyl acrylate homopolymers; copolymers of acrylic acid with olefinically unsaturated monomers, e.g., butadiene-1,3; vinyl chloride; polyvinyl butyral; polyvinylidene chloride; copolymers of vinylidene chloride; copolymers of vinylidene chloride with acrylic acid, acrylonitrile, methyl acrylate, ethyl acrylate, etc.; homopolymers and copolymers of vinyl stearate, vinyl pyridine, vinyl styrene, styrene, methyl styrene, cyanoacrylate; polyethylene, polypropylenes, ethylene-propylene copolymers; ethylene-propylene terpolymers, e.g., terpolymers of ethylene, propylene and a conjugated or nonconjugated $C_4$ to $C_6$ diene, e.g., hexadiene-1,3, hexadiene-1,4, etc.; copolymers of styrene with butadiene and/or acrylonitrile; natural rubber; polychloroprene rubbers, e.g., polychloroprene, copolymers of chloroprene and acrylonitrile; natural rubber; butyl rubber (copolymers of isobutylene and small amounts of diolefins, e.g., isoprene; carboxy-modified copolymers of butadiene and acrylonitrile; etc.

In order to obtain the full measure of the benefits available by the present invention, it is necessary to employ the plasticizer (covered) and covering material in certain weight ratios. Accordingly, the weight ratio of the covered plasticizer to the "covering material" can range from about 1.5 to 20:1. At weight ratios below about 1.5:1 adhesion of the thermoplastic resin adhesive suffers when the plasticizer(s) are incorporated in the normally employed concentration ranges with respect to the thermoplastic resin adhesive. On the other hand, at weight ratios of plasticizer to covering material in excess of about 20:1, heavy blocking, spotting and fiber picking occurs. The latter problem is especially acute when thermoplastic resin adhesives containing the covered plasticizers wherein the weight ratio of plasticizer to covering material exceeds 20:1 is employed in conjunction with an unsized and hence highly porous fibrous substrate, e.g., unsized wallpaper base stock. Usually weight ratios of said plasticizer to covering material of greater than about 1.7:1 to approximately 12:1 are used, with the preferable weight ratios of the plasticizer to the covering material varying from approximately 1.8:1 to 12:1, especially when fibrous substrates, e.g., comparatively nonporous paper substrates are employed in conjunction therewith. An example of a comparatively nonporous paper substrate is commercially available prefilled wallpaper stock.

While the average thickness of the covering can range from about 0.02 to about 20 microns, usually it ranges from about 0.05 to about 10 microns and more usually from about 0.1 micron to about 10 microns.

It should be noted however that the thickness of the individual covering can exceed 20 microns in cases where the covering material is to be heated at temperatures in excess of the threshold of its melting range during thermal activation of the adhesive. In such cases practically any covering thickness can be used which is consumate with adequate adhesive power.

When the covered individual tackifying plasticizer cores are heated to a temperature in excess of their melting range, microscopic studies reveal that the core material, viz, the tackifying plasticizer, egresses from the covering with the result that large sections of the covering are often ruptured, e.g., in certain portions; and the plasticizer thus egresses from the covering. In other cases, small portions of the covering are ruptured, ostensibly breaking the covering structure into small individual or agglomerate portions. Actually, a mixed behavior is observed during egress with the melted plasticizer in some cases breaking through certain portions of the covering as it leaves and in other cases the droplets of melting plasticizer simply appear to pass through the liquid covering leaving the predominant portion of it ostensibly unruptured. In this respect the substantially continuous covering appears to be liquid porous.

THERMOPLASTIC RESIN(S)

A wide variety of thermoplastic resins can be employed to constitute the predominate portion of the heat activatable, thermoplastic adhesive formulations on a weight basis. Not only one but a mixture of various thermoplastic resins can be used. The selection of a given thermoplastic resin or mixture thereof will be dictated largely by the properties desired in the final adhesive, e.g., thermal activation temperature, viz, the heat sealing temperature or temperature range desired for a given application; adhesive power for a given substrate; etc. Bearing this in mind, suitable thermoplastic resins which can be employed in accordance with this invention include, but are not limited to, the following: cellulose acetate; cellulose acetate butyrate; cellulose nitrate; ethyl cellulose; polymethyl methacrylate; polystyrene; polyvinyl acetate; polyvinyl chloride; copolymers of vinyl chloride and vinyl acetate, e.g., those containing from about 20 to 88 percent vinyl chloride and 80 to 12 weight percent vinyl acetate; polyvinyl butyral (polyvinyl butyraldehyde); polyvinylidene chloride homopolymers and copolymers; nondrying alkyd resins; nondrying phenolic resins; coumarone-indene resins; mixtures containing any two or more of the aforementioned materials; etc. Thus it will be realized that a wide variety of different types of natural and synthetic thermoplastic resins can be employed in accordance with the present invention. Of course, to suit a given specific purpose for which the heat sealing adhesive is to be employed, a given particular thermoplastic resin or mixture thereof can be selected which incorporates nonthermoplastic components.

ADHESIVE COMPONENTS

The adhesive compositions of this invention usually contain a thermoplastic resin(s), a plasticizer(s) at least a portion of which is solid particulate with individual coverings and optional coloring agents, fillers, stabilizers, etc., with the optional formulation agents being present in conventional concentrations for heat sealable thermoplastic compositions.

According to one of the embodiments of the present invention, a plurality of plasticizers is employed with one or more but usually not all of the plasticizers being covered. Accordingly, the concentration of total plasticizer, based on total adhesive, can range from about 19.0 to about 33.3 weight percent, usually ranges from 21 to 29 weight percent, and more preferably (especially for wallpaper end use applications) ranges from 22 to about 25 weight percent. The concentration of individually covered particulate plasticizer, based on total thermoplastic adhesive including plasticizers, can range from about 7.0 to about 25.0 weight percent, usually ranges from about 7.3 to about 17.5 weight percent and preferably ranges from about 7.5 to about 10.0 weight percent. The concentration of uncovered plasticizer, viz, plasticizer which is in direct contact with the thermoplastic resin adhesive, can range from about 0 percent to about 17.5 weight percent, usually ranges from about 7.1 to about 17.1 weight percent and preferably ranges from about 7.3 to about 16.7 weight percent expressed as a weight percent based on total adhesive.

The concentration of higher melting polymer, including that providing the individual covering, based on total adhesive, can range from about 0.3 to about 18 weight percent and preferably ranges from about 8.3 to about 10.8 weight percent.

A wide variety of porous and nonporous materials can be employed as substrates in accordance with this invention. Of course, the particular substrate employed is in accord with the predetermined end use for which the article (3) is to be employed. Suitable exemplary substrates which can be employed include, but are not limited to, the following: porous and comparatively nonporous paper, e.g., wallpaper stock which ranges in weight from about 40 to about 90 pounds per 3000 ft.$^2$ ream (both filled and unfilled) various metal foil materials, such as aluminum foil, tin foil, copper foil, gold foil, etc.; various plastic film, sheet and layer materials, such as polyester, e.g., polyethylene glycol terephthalate ("Mylar"), polyvinyl chloride, polyvinyl acetate, copolymers of vinyl chloride and vinyl acetate, polyethylene, polypropylene, copolymers of ethylene and propylene, terpolymers of ethylene, propylene and conjugated or nonconjugated $C_4$ to $C_8$ diolefins; woven or nonwoven fabrics, e.g., cotton, polyamides, e.g., nylon, glass fibers, polyester fibers, e.g., "Dacron," acrylic fibers, e.g., "Acrylan"; washable wall coverings, e.g., cloth coated with flexible water resistant plastic materials, e.g., plasticized polyvinyl chloride, using a plasticizer such as dibutyl phthalate, dioctyl phthalate, di-2-ethyl hexyl phthalate, etc.

The amount of adhesive employed, based on area of substrate covered (expressed as pounds per 3000 ft.$^2$ ream), can vary widely depending upon the end use of the ultimate article, method of application of the coating, viscosity of the coating composition, substrate porosity, and other factors. Hence, the amount of the thermoplastic adhesive applied, based on substrate area, can range from about 1 to about 50 pounds per 3000 ft.$^2$ ream. Usually, however, for most purposes the adhesive ranges from about 4 to about 40 pounds per ream and in the case of wallpaper, aluminum foil, Mylar and vinyl plastics, the concentration of total thermoplastic adhesive ranges from about 5 to about 30 pounds per ream.

FORMATION OF INDIVIDUALLY COVERED PLASTICIZERS SOLIDS

The individually covered plasticizer solids of this invention can be prepared readily by dispersing the solid plasticizer(s) particles, which are usually previously ground to a particle size of less than about 50 microns, in finely ground form in a latex of a comparatively hard, higher melting, water-insoluble polymeric material. The polymer latex particles usually range in average size from about 0.5 to about 2 microns. The dispersion medium for the latex is usually water. While this aqueous dispersion, viz, aqueous latex, is being agitated, a precipitating agent such as a salt, e.g., monosodium phosphate, is added. This affects precipitation or coalescence of the polymeric latex particles. Coalescence can also be secured by heating.

As the polymeric latex particles coalesce, they accumulate about the dispersed solid plasticizer particles thus depositing thereon thin, individual coverings of the comparatively hard, higher melting covering polymer. Upon completion of the latex precipitation each of the individual, solid plasticizer core particles is provided with a thin, solid-retaining, liquid-porous, substantially continuous covering of the harder, higher melting polymer. This covering acts as an effective barrier against premature mixing in the solid state of the plasticizer with the thermoplastic resin, which solid state mixing, viz, cold flow, results in blocking. Electron microscope studies (at magnifications of 48,200; 79,000; 110,000 and 142,000:to one) reveal the coverings to be substantially continuous in that no openings are observable therein.

Subsequent to formation of the covering, the covering is "aged." This "ageing" is conducted by heating the covered plasticizer particles at temperatures ranging from about 40° C. to a practical maximum temperature below the melting range of the core plasticizer, usually about 55° C., for time periods ranging from about 10 to about 300 minutes. One effect of the ageing is to increase the adhesion of the higher melting polymer particles to the core of tackifying plasticizer(s).

Upon melting the core, such as occurs during thermal activation of the adhesive, the tackifying plasticizer material readily egresses, viz, flows out of the covering. Thus, upon application of heat, the adhesive, containing the individually covered tackifying plasticizers solids, is activated; yet the blocking resistance of such compositions is greater than that which prevails when the same tackifying plasticizer solids are not provided with such individual coverings. Moreover, the adhesive performance of heat sealable thermoplastic resin adhesive compositions containing the individually covered plasticizer solids is superior to that of compositions containing the same amount of the tackifying plasticizer (uncovered) and an equivalent amount of the extending, viz, higher melting covering material, viz, latex.

The thermoplastic adhesives containing a profusion of uniformly distributed individually covered tackifying plasticizer solids are usually applied as aqueous dispersions containing from about 30 to about 60 percent, by weight, adhesive solids and can be prepared readily from the "aged" individually covered plasticizer solids by the following illustrative exemplary procedure: 54.5 parts of 55 percent Borden Polyco 2188 emulsion and 127 parts of 55 percent Borden Polyco 2190 emulsion are added to a suitable vessel equipped with a stirrer. To this emulsion blend is added, with stirring, 65 parts of an aqueous SE10 dispersion which contains 50 percent solids (30.0 parts SE10 covered individually with 2.5 parts Borden Polyco 2188 particles) (12:1 phase ratio). Also added with stirring is 140 parts of a DPP-MHP aqueous dispersion which contains 50 percent solids (60 parts DPP, 10 parts MHP, and a conventional small amount of "Tamol-731" which is used as the dispersing agent). 18.5 parts of water are then added to adjust the total solids of the formulation to approximately 50 percent.

The articles of manufacture referred to herein by the designation (3) and comprising the thermoplastic adhesives (2) joined to a paper or other substrate can be prepared readily in accordance with this invention by knife coating, roller coating, spraying, depositing, or otherwise joining, the adhesive (2) to the desired substrate. An exemplary, illustrative procedure for preparing the articles of manufacture (3) is as follows: In order to reduce the amount of coating weight of the thermoplastic adhesive formulation necessary, a "filler" coating is first applied to the wallpaper base stock. The "filler" coating consists of 2 parts of a suitable clay, and, one part of a suitable latex, e.g., "Polyco 2186," Dow SBR (styrene-butadiene rubber) latex, dispersed in 2 parts water containing a dispersing agent such as Calgon. This is a conventional "filler" coating formulation used throughout the paper and coating industry.

An approximately 10 pounds/3000 sq. ft. ream coating is applied to an 18 oz. (approximately 60 pounds/3000 sq. ft. ream) paper by means of conventional coating techniques (i.e., air-knife coater, puddle-blade coater, gravure roll, trailing-blade coater, reverse-roll coater, etc.). This coating is then dried by conventional techniques, i.e., a forced air drying tunnel with three temperature zones. The air flow rate can be adjusted separately in each of the three temperature zones. The temperatures in the three zones can also be varied. This "filler" coated wallpaper stock can then be rewound for later use.

The filled wallpaper stock is then coated with from 10 pounds/3000 sq. ft. ream to 20 pound/3000 sq. ft. ream of the thermoplastic adhesive composition of this invention by conventional coating techniques as indicated above. The drying procedure can be the same as used in the case of the "filler" coating. It is important in this step that the temperature of the paper web being dried does not exceed the thermal activation temperature of the thermoplastic adhesive formulation because premature activation leads to blocking and picking when the coated roll is unwound later for printing. It must be noted, however, that the temperature of the air in the first zone may be considerably higher than the activation temperature. This is compensated for by the water which is leaving the web so that the actual temperature of the web is still below the thermal activation temperature.

It is also possible to coat the "filler" coating and the thermoplastic adhesive formulation on a single pass through the coating apparatus. The "filler" coating is first applied by conventional techniques, and partially dried as above. The web then continues to a second station where the thermoplastic adhesive composition is coated via conventional techniques and the web is then further dried to <5 percent moisture in the three zone drying tunnel. It is then wound on a core ready to be printed.

It should be clearly understood that it is within the purview of the present invention to provide the noncoated side of the substrate, e.g., paper, with a design, printing, embossment, or other mono- or polychromatic indicia. Thus, for example, 55 to 80 pounds per 3000 sq. ft. ream wallpaper base stock can be provided with a multicolored design prior to the deposition of the thermoplastic adhesive formulation containing the discontinuously covered plasticizer solids thereon. Also, it is possible in accordance with this invention to first apply the thermoplastic adhesive formulation containing the discontinuously covered plasticizer solids uniformly distributed therethrough to one side of the substrate and then apply the printing or indicia to the opposite uncoated side thereof. Alternatively, the printing and adhesive can be applied simultaneously on opposite sides of the substrate. Conventional coating, printing and other deposition techniques can be employed for depositing the film plastic adhesive formulations, containing the discontinuously covered plasticizers. Of course, the coating or deposition temperatures used should be below that at which the plasticizer and thermoplastic resinous adhesive would become thermally activated.

One illustrative and exemplary procedure for preparing articles of manufacture (3) is as follows:

The roll of filler coated, thermoplastic adhesive coated wallpaper stock can then be printed on the reverse (as yet uncoated) side by conventional wallpaper printing techniques (i.e., gravure printing) using conventional wallpaper printing inks, pigments, or dyes. This finished product can then be vinyl coated on the printed side and/or subsequently embossed, without altering the basic functional properties of the thermoplastic adhesive coating.

It is also possible for the printing and/or the vinyl coating step to be done prior to deposition of the "filler" and thermoplastic adhesive coating. Alternately, the printing and the adhesive can be applied (simultaneously) on a single pass, eliminating rewind, on opposite sides of the substrate, i.e., gravure to print and reverse roll to coat filler at one station, and the same or another technique to apply the thermoplastic adhesive composition at another station.

As noted hereinabove, one of the major purposes of this is the production of prepasted wallpaper and wall coverings. The present invention, by the use of thermally activatable adhesives "prepasted onto the wall covering base stock, eliminates a large portion of the messy problems associated with both conventional water-activated prepasted wall coverings and the even more problematic "wet paste" wallpaper. The thermally activatable, prepasted wall coverings (3) can be applied readily by heat sealing the adhesive articles (3) to the wall to be covered e.g., using an applicator which heats and presses the article (3) to the base with the heat being applied to the decorative side of the wallpaper. This is the same method of application to be used in affixing the prepasted wallpaper (3) to a wall, e.g., plaster wall, dry wall, wooden walls, etc. The applicator, e.g., a light weight hand iron or portable heated roller is of the heat regulated type so that the heat applied to the paper (unpasted) side is of sufficient magnitude to activate the adhesive, but insufficient to cause thermal damage to the paper base stock. Slight (hand) pressure is also applied via the applicator, to assist in adhering the wallpaper or wall covering to the wall. Moderate pressures, e.g., ranging from 0.1 to 40 p.s.i. give satisfactory applications.

A further embodiment of this invention resides in the production of composite articles (7), such as prepapered wall panelling. An exemplary and illustrative procedure for forming wallpaper panelling of prematched designs on a suitable base is given hereinbelow. While the base specifically mentioned below is conventional dry wall; the procedure is essentially the same regardless of the nature of the base material, e.g., plywood, composition board, "Beaverboard," etc. Wallpaper stock or other decorative coated and/or laminate material is coated with the thermoplastic adhesive composition, printed, vinyl coated and/or embossed as set forth above. This finished wallpaper is then adhered by thermal bonding, e.g., using applicators as noted above, to four foot by eight foot sheets of suitable conventional dry wall. The wallpaper must be prematched in such a manner that when the dry wall is affixed by suitable methods (i.e., staples, nails, adhesive such as epoxy and other methods) to studding or over other materials the wallpaper design will match in all cases and in all dimensions.

The invention will be illustrated in great detail by the examples which follow. In the examples below, all parts, percents, ratios and concentrations are by weight unless otherwise indicated.

EXAMPLE I

This example illustrates preparation of thermoplastic adhesive compositions containing a mixture of thermoplastic resins with both individually covered plasticizer particles and a mixture of uncovered plasticizers with the weight ratio between the individually covered plasticizer and uncovered plasticizers being slightly less than 0.43:1,, vis, the concentration of individually covered plasticizer solids was 30 weight percent, based on total plasticizer present. In these compositions the ratio of covered plasticizer (core plasticizer) to covering material ranged from 3 to 12:1.

The plasticizer to be covered, viz, a commercially available glycerol ester of hydrogenated rosin marketed by Hercules Powder Company under the trade designation "Staybelite Ester No. 10" was preground (single pass) in an ice crushing machine, along with Dry Ice, to reduce its size from large chunks to a size where a fine grinding unit can subsequently handle it, viz, to an average particle size of less than about 2,000 microns.

Then 30 parts of the preground glycerol rosin ester plasticizer were preslurried in 30 parts of water containing 0.45 part of a commercially available dispersing agent, "Tamol 731" (Rohm and Haas Co.), which is a sodium salt of polymeric carboxylic acid. This dispersion is then fed to an Attritor and finely ground to a particle size of less than 50 microns, e.g., average diameter of approximately 20 microns.

A separate mixture of 60 parts of diphenyl phthalate and ten parts of a commercially available aryl sulfonamide-formaldehyde resin plasticizer, marketed by Monsanto Company under the trade designation "Santolite MHP," (preground in the same manner as indicated above) was preslurried with 1.05 parts of "Tamol 731" and 70 parts of water. This mixture constitutes the plasticizer which is to remain uncovered in the thermoplastic resin adhesive composition.

The glycerol ester slurry, containing the plasticizer solids to be individually covered was then added to a suitable mixing tank, along with 27 parts of the higher melting polymeric latex covering material, a commercially available high molecular weight polyvinyl acetate homopolymer aqueous emulsion containing approximately 55 weight percent (plus or minus 0.5 weight percent) of polyvinyl acetate solids (marketed under the trade designation "Polyco 2188" by Borden Chemical Company, Thermoplastics Division) and 210 parts of water. This mixture was stirred from approximately 30 minutes.

Then 60 parts of anhydrous monosodium phosphate salt were added to the mixture with stirring. One hour after the addition of the phosphate salt, the formulation was heated to a temperature of 50 degrees centigrade and held at that temperature for three hours. The addition of the phosphate salt causes the polyvinyl acetate higher melting latex solids to coalesce or accumulate about the dispersed solid plasticizer particle cores thereby resulting in the individually covered plasticizer solids referred to previously herein. The heating for 3 hours at 50 degrees centigrade is the "ageing" procedure referred to hereinabove, viz, the procedure whereby the adhesion between the recently deposited polyvinyl acetate covering is enhanced with respect to the core plasticizer material. The formulation containing the covered plasticizer particles is then cooled to room temperature and stirred for a period of 15 to 16 hours, viz, overnight.

Then the dispersion containing the thus covered plasticizer solids was filtered to a 40 to 50 percent solids filter cake, redispersed in fresh water and refiltered. This redispersion and refiltration procedure is repeated twice to remove the residual phosphate salt from the covered plasticizer solids. The weight percent solids remaining on the resulting final filter cake is approximately 67.2 percent. The final filter cake is a loosely bound structure of covered glycerol rosin ester plasticizer solid cores having an average particle size of about 20 microns, with individual "bumpy" coverings of polyvinyl acetate solids thereon. The ratio of covered (core) plasticizer to covering material was approximately 3:1.

The thermoplastic resin components of the adhesive, 54.5 parts of a commercial available polyvinyl acetate homopolymer emulsion, "Polyco 2188," and 127 parts of a commercially available copolymer emulsion of an anionic vinyl acetate-acrylate (marketed by the Borden Chemical Company, Thermoplastics Division, under the trade designation "Polyco 2190") are placed in a suitable mixing vessel to which is then added gradually with mixing the polyvinyl acetate latex covered glycerol rosin ester plasticizer solids. The previously finely ground mixture of diphenyl phthalate and sulfonamide-formaldehyde resin plasticizers was then added to the formulation tank, as a previously prepared dispersion, with stirring. Additional water was added to adjust the formulation to a solids concentration of 50 percent. The adhesive formulation, thus prepared, is now in a form suitable for coating using any of the above described procedures onto various substrates to enable said substrates to be heat sealed with moderate pressures to any desired base material, e.g., dry wall, plaster, wood, etc.

The above procedure was repeated except that instead of employing a 3:1 weight ratio of "core" plasticizer to covering material; weight ratios of 4:1, 8:1, and 12:1, respectively, were employed. The compositions were otherwise the same as the 3:1 composition. Each of these compositions is useful as an ambient temperature nontacky, blocking-resistant, heat-sealable thermoplastic adhesive, e.g., for prepasting wallpaper.

EXAMPLE II

This example is similar to Example I except that the diphenyl phthalate plasticizer solids are provided with the covering.

Separate aqueous dispersions of finely ground diphenyl phthalate and a mixture of glycerol ester of hydrogenated rosin and sulfonamide-formaldehyde resin plasticizers were prepared in accordance with the procedure of Example I. The diphenyl phthalate aqueous dispersion contained 60 parts of diphenyl phthalate, 60 parts of water and 0.9 part of the "Tamol 731" dispersing agent. The glycerol rosin ester/sulfonamide-formaldehyde resin plasticizer mixture aqueous dispersion contained 30 parts of the glycerol rosin ester, 10 parts of the sulfonamide-formaldehyde resin, 70 parts of water and 0.6 part of the "Tamol 731" dispersing agent.

The diphenyl phthalate dispersion was then provided with a covering of polyvinyl acetate homopolymer ("Polyco 2188") using a 2:1 ratio of diphenyl phthalate core to the covering material. The individually covered plasticizer solids were aged using the procedure of Example I.

The thermoplastic adhesive composition containing the individually covered diphenyl phthalate solid plasticizer particles was then formulated in accordance with the procedure of Example I, using the following weight concentrations of the components. 1 part of total solid plasticizer (0.6 part of diphenyl phthalate, covered), 0.3 part of glycerol ester of the hydrogenated rosin and 0.1 part of the sulfonamide-formaldehyde resin plasticizer, to one part of the sum of "free" polyvinyl acetate homopolymer, "Polyco 2188," and "free" polyvinyl acetate copolymer, "Polyco 2190," viz, total free latex solids, in the same weight concentration in which said latex materials are present in Example I. The final adhesive formulation contains 50 percent solids (adjusted by addition of water) as in Example I, and is useful as a blocking-resistant prepaste coating for wallpaper.

EXAMPLE III

This example is similar to Example I, with the exception that the covered plasticizer is a mixture of diphenyl phthalate and sulfonamide-formaldehyde resin, "Santolite MHP."

An aqueous dispersion of finely ground plasticizers containing a mixture of 60 parts of diphenyl phthalate, 10 parts of "Santolite MHP," 70 parts water, and 1.05 parts "Tamol-731" dispersing agent was prepared in the manner specified in Example I. A separate aqueous dispersion containing 30 parts of finely ground glycerol ester of hydrogenated rosin, "Staybelite Ester No. 10," 30 parts of water and 0.45 part of "Tamol-731" dspersing agent was also prepared under the Example I procedure.

The particulate mixture of diphenyl phthalate and the sulfonamide-formaldehyde resin plasticizer solids was provided with individiual coverings of polyvinyl acetate homopolymer, "Polyco 2188," and aged in the same manner as Example I. Then the thermoplastic resin adhesive was formulated according to the Example I procedure using the following concentrations of the indicated components: 1 part total solid plasticizer (0.6 part of diphenyl phthalate, 0.3 part of said glycerol ester hydrogenated rosin, and 0.1 part of sulfonamide-formaldehyde resin plasticizer) to one part of polyvinyl acetate homopolymer emulsion and polyvinyl acetate copolymer emulsion as indicated in Example I. The final adhesive formulation was adjusted by addition of water to contain 50 weight percent solids.

Further preparations were conducted wherein the ratio of solid plasticizer to covering material in the discontinuously covered plasticizer mixture was at 4:1 and 8:1. These adhesive formulations are useful as blocking-resistant prepaste coatings for wallpaper or other wall covering materials, e.g., cloth coated with plasticized polyvinyl chloride using dibutyl phthalate, dioctyl phthalate di-2-ethylhexyl phthalate) as plasticizer. Such wall coverings are washable.

EXAMPLE IV

This adhesive preparation procedure is essentially the same as in Example I with the exception that the covered plasticizer is a mixture of the glycerol ester of hydrogenated rosin and a sulfonamide-formaldehyde resin plasticizer.

An aqueous dispersion containing a finely ground mixture of 30 parts of a glycerol ester of hydrogenated rosin, "Staybelite Ester No. 10," 10 parts of a sulfonamide-formaldehyde resin plasticizer, "Santolite MHP," 40 parts of water and 0.6 part of a dispersing agent, "Tamol-731," was prepared in accordance with Example I. A separate aqueous dispersion containing 60 parts of finely ground diphenyl phthalate, 60 parts of water and 0.9 part dispersing agent, "Tamol-731," was also prepared in accordance with the Example I procedure.

Then the mixed plasticizer solids were provided with individual coverings of polyvinyl acetate homopolymer, "Polyco 2188," employing a weight ratio of the mixed plasticizer core to the covering material of 2:1 using the same procedure as in Example I. Subsequent to the formation of the covered plasticizer solids and the ageing of the covering; the thermoplastic, heat sealing adhesive formulation was prepared in accordance with the Example I procedure using the following concentration of the various components: 1 part of total solid plasticizer (0.6 part of diphenyl phthalate, 0.3 part of glycerol ester of hydrogenated rosin, and 0.1 part of sulfonamide-formaldehyde resin plasticizer) to one part of the total of polyvinyl acetate homopolymer plus polyvinyl acetate copolymer. The final formulation was adjusted by the addition of water to contain 50 percent solids, in the manner noted in Example I. This adhesive formulation is likewise useful as a blocking-resistant prepaste coating for wallpaper or other wall covering materials.

EXAMPLE V

This example illustrates the enhanced resistance to blocking achieved by the thermoplastic adhesives of the present invention versus comparable formulations which contain the same components but wherein the plasticizer solids are not provided with individual covering.

Adhesive formulations having the below tabulated compositional components in the below indicated weight proportions were prepared essentially in accordance with the procedure indicated in Example I. Some formulations contained free (uncovered) plasticizer(s), viz, in the control runs the plasticizer(s) are totally uncovered, and for these controls, the covering procedure was by-passed, of course.

These adhesives were then applied to a bond paper substrate having a weight of approximately 41 pounds per 3000 sq. ft. ream. The adhesive coatings were applied by the following procedure: The sheet to be coated is taped to a coating stage. A small amount (approximately 20 cc.) of adhesive is applied to the paper and the coating is drawn down most usually using a number 30 Meyer rod to achieve a coating weight of most usually 17±1 pounds per 3000 sq. ft. ream of active adhesive, e.g., solid thermoplastic adhesive film.

The coated substrates were then subjected to adhesive activation and blocking tests. The adhesvie activation tests were conducted by holding an adhesive-coated strip of forty-one pound per 3000 ft. ream bond paper against an uncoated strip of the same paper with the heat being applied by placing a heated iron, maintained at 95 degrees centigrade for five seconds, on the uncoated side of the adhesive-coated paper sheet. The blocking tests were conducted at room temperature (68° F.), 105° F., and 140° F. in accordance with ASTM D1146-53 (1965). In reporting the blocking test results, the terminology of ASTM D1146-53 (1965) has been employed. The terms used are defined here for ready reference. "Second Degree Blocking" means an adherence of such extent that when the surfaces under test are parted one surface or the other will be found to be damaged. "First Degree Blocking" means an adherence between the surfaces under test of such extent that when the specimen is lifted the lower specimen will cling thereto, but may be parted with no evidence of damage to either surface. "Free" means absence of both second and first degree blocking.

In Table 1 below, a "Yes" entry means that the specimen tested exhibited a "Second Degree" block; a "No" entry means that the specimen tested did not exhibit a "Second Degree" block, but did show a "First Degree" block; and a "Free" entry means no blocking, whatsover. Adhesives resulting in "First Degree" block are considered acceptable for most purposes including use on wallpaper. Adhesives resulting in "Second Degree" block are considered unacceptable for most purposes including use on wallpaper. Adhesives resulting in "Free" of all blocking are considered acceptable for all purposes insofar as resistance to blocking is concerned.

the particular substrate employed. This will be illustrated below using one heat-sensitive substrate, viz, paper.

Thermoplastic, heat-sealing adhesives were prepared in accordance with the Example I procedure and con-

TABLE 1

| Run | Ratio total "Polyco 2188" to total "Polyco 2190" | Plasticizer(s) covered | Ratio of covered plasticizer to covering | Thermal activation (5 seconds at 95° C., 203° F.) | Blocking at room temp. (68° F.) and 10 p.s.i. | | Blocking at 105° F. (1 p.s.i.) | | Blocking at 140° F. (1 p.s.i.) | | Total plasticizer concentration [3] |
|---|---|---|---|---|---|---|---|---|---|---|---|
| | | | | | AA [1] | PA [2] | AA [1] | PA [2] | AA [1] | PA [2] | |
| 1 | 15:85 | None | | Yes | Yes | No | Yes | Yes | Yes | Yes | 50.0 |
| 2 | 15:85 | SE-10 | 1.86:1 | Yes | No | No | Yes | No | Yes | Yes | 46.3 |
| 3 | 20:80 | None | | Yes | Yes | No | Yes | Yes | Yes | Yes | 50.0 |
| 4 | 20:80 | SE-10 and MHP | 2:1 | Yes | No | Free | Yes | No | Yes | No | 51.3 |
| 5 | 30:70 | None | | Yes | Yes | No | Yes | Yes | Yes | Yes | 50.0 |
| 6 | 30:70 | SE-10 and MHP | 2:1 | Yes | Yes | No | Yes | No | Yes | Yes | 58.9 |
| 7 | 30:70 | SE-10 | 1.86:1 | Yes | No | No | Yes | No | Yes | No | 46.3 |
| 8 | 30:70 | do | 12:1 | Yes | No | No | Yes | No | Yes | No | 49.4 |
| 9 | 30:70 | do | 8.2:1 | Yes | No | No | Yes | No | Yes | Yes | 49.1 |
| 10 | 35:65 | None | | Yes | Yes | No | Yes | Yes | Yes | Yes | 50.0 |
| 11 | 35:65 | SE-10 and MHP | 2:1 | Yes | No | No | Yes | No | Yes | Yes | 64.5 |
| 12 | 35:65 | DPP | 2:1 | Yes | No | Free | Yes | No | Yes | Yes | 55.5 |
| 13 | 35:65 | SE-10 | 4:1 | Yes | No | No | Yes | No | Yes | No | 48.2 |
| 14 | 40:60 | None | | Yes | Yes | No | Yes | Yes | Yes | Yes | 50.0 |
| 15 | 40:60 | SE-10 | 1.77:1 | Yes | No | No | Yes | No | Yes | No | 46.3 |
| 16 | 50:50 | None | | Yes | Yes | No | Yes | No | Yes | Yes | 50.0 |
| 17 | 50:50 | SE-10 and MHP | 1.82:1 | Yes | Yes | Free | Yes | No | Yes | Yes | 45.0 |
| 18 | 50:50 | SE-10 | 1.86:1 | Yes | Yes | No | Yes | No | Yes | Yes | 46.3 |
| 19 | 55:45 | None | | Yes | Yes | No | Yes | No | Yes | Yes | 50.0 |
| 20 | 55:45 | DPP and MHP | 1.82:1 | Yes | No | No | Yes | No | Yes | Yes | 42.0 |
| 21 | 60:40 | None | | Yes | Yes | No | Yes | No | Yes | Yes | 50.0 |
| 22 | 60:40 | DPP; SE-10 and MHP (V12, all). | [4] 1.82:1 | Yes | No | No | Yes | No | Yes | No | 39.3 |

[1] AA=Adhesive to adhesive.
[2] PA=Paper to adhesive.
[3] Weight percent, based on total latex plus total plasticizer.
[4] Both.

As will be noted from Table 1 above, the thermoplastic, heat-sealable adhesives containing individually covered plasticizer in accordance with this invention afford enhanced resistance to blocking over comparable adhesives but where the plasticizer is totally uncovered. Thus, the blocking resistance in each of control Runs 1, 3, 5, 10, 14, 16, 19 and 21 is enhanced by use of the present invention. The improvements in blocking resistance afforded by the present invention, without loss of thermal activation and adhesion properties, are readily apparent. It will also be noted that these improvements are general, viz, they are attainable over a wide range of: thermoplastic resin compositions, ratios of plasticizer to covering, concentration of total plasticizer which is provided with covering; total plasticizer concentration, etc.

EXAMPLE VI

Each thermoplastic resin (or combination of resins) will have its own "substrate-oriented" heat sealing temperatures which should be observed in order to achieve satisfactory thermal activation without deleteriously affecting a given substrate material. The same basic adhesive, viz, having the same overall compositional ratio of higher melting polymer to lower melting polymer can thus be tailor-made to heat seal at different temperatures, depending on the particular substrate to which it is applied, by controlling the concentration of higher melting polymer which is present as covering material. This example illustrates the effect on thermal activation temperatures which the concentration of the higher melting polymer covering material has.

Hence, in order to avoid thermal damage to a given substrate material, its maximum heat sealing temperature should not be exceeded. That is not to say that heating to the thermal activation temperature(s) causes pyrolitic damage to the thermoplastic adhesive, however; but merely that each substrate limits the maximum thermal activation (heat-sealing) temperature which can be used with the adhesive coated thereon. Therefore, the thermal activation temperature(s) of the adhesive can be controlled by limiting the concentration of higher melting covering polymer to a concentration range in which it secures adequate resistance to blocking yet can be thermally activated at a low enough temperature to avoid thermal damage to taining the below tabulated concentrations of total plasticizer, at least a portion of which was provided with a polyvinyl acetate homopolymer ("Polyco 2188") discontinuous covering as in Example I. The covering was aged and the adhesives were formulated containing the polyvinyl acetate homopolymer and polyvinyl acetate copolymer according to Example I above.

These adhesives were then coated onto a bond paper substrate having a weight of approximately 41 pounds per 3000 sq. ft. ream. Then thermal activation and blocking tests were conducted as in Example V. The pertinent experimental data are summarized in Table 2.

In each of the below runs, 60 weight percent of total plasticizer is diphenyl phthalate, 30 weight percent is a glycerol ester of hydrogenated rosin and 10 weight percent is a sulfonamide-formaldehyde resin.

In Runs 3, 7 and 9, 60 weight percent of total plasticizer was individually covered, viz, the diphenyl phthalate. In Runs 1, 2, 4 and 6, 40 weight percent of total plasticizer was covered, viz, a mixture of glycerol ester of hydrogenated rosin ("Staybelite Ester No. 10") and aryl sulfonamide-formaldehyde resin plasticizer ("Santolite MHP"). In Runs 5, 8 and 10, 100 weight percent (viz, all) of the plasticizer is covered, viz, two types of covered plasticizers, one being a mixture of glycerol ester of hydrogenated rosin with sulfonamide-formaldehyde resin and the other being covered diphenyl phthalate.

As indicated from the data in Table 2, unsatisfactory heat sealing (thermal activation) results from too high a concentration of covering material when the substrate material dictates a maximum practical temperature for heat sealing. Usually in order to avoid heat damage to the paper, the thermoplastic adhesive should not require thermal activation temperatures substantially in excess of about 150° C. (312° F.). Thus, for such selected thermoplastic resinous adhesives, the concentration of covering polymer should usually be less than about 40 percent to avoid thermal damage to the paper substrate.

It should be noted, however, that covering polymer concentrations of 40 percent and higher do not adversely affect resistance to blocking as will be noted from the blocking results for Runs 8–10. Moreover, the thermoplastic adhesives of Runs 8–10 did activate well at 150° C. (302° F.) in five seconds without causing thermal damage to the adhesive. Hence, higher concentrations of covering material can be used in conjunction with substrates having greater resistance to heat without losing either proper heat sealing or enhanced resistance to blocking. While the adhesive formulations of Runs 8 to 11 are suitable for use on paper substrates even though the covering latex concentration exceeds 40 percent; this is because paper can withstand the 150° C. thermal activation temperature. On the other hand, with substrate materials which are more sensitive to heat, e.g., vinyl plastic substrates, adhesives should be used which can be thermally activated at temperatures not substantially in excess of about 95° C. In such cases the concentration of covering latex should usually be less than about 40 percent.

EXAMPLE VII

Use of heat, rather than salt to form covering

Thirty parts of preground (as in Example I) glycerol ester of hydrogenated rosin, "Staybelite Ester No. 10," were preslurried in 30 parts of water containing 0.45 part of "Tamol 371." This dispersion is then fed into an Attritor and finely ground to a particle size of less than 50 microns, e.g., average diameter of approximately 20 microns.

The glycerol ester slurry, containing the plasticizer particles provided with individual coverings, was then added to a suitable mixing tank along with 4.55 parts of the higher melting polymeric latex covering material, a commercially available polyvinyl acetate homopolymer aqueous emulsion containing 55 weight percent of polyvinyl acetate solids and 98 parts of water. This mixture was stirred for approximately 30 minutes.

The formulation is then heated to a temperature of 50° C. and held at that temperature for 3 hours. The heating causes the polyvinyl acetate higher melting polymeric latex solids to coalesce or accumulate about the dispersed solid plasticizer particle cores thereby resulting in the individual covering referred to previously herein. The heating also is the "ageing" procedure referred to hereinabove. The formulation containing the individually covered plasticizer particles is then cooled to room temperature and stirred for a period of 15 to 16 hours, viz, overnight. This dispersion is then formulated, after filtering as in Example I, with the DPP–MHP dispersion and the blend of Polyco 2188 and Polyco 2190 referred to in Example I.

EXAMPLE VIII

This example illustrates the use of the blocking-resistant adhesives of the present invention on polyester and rubber surfaced paper substrates, respectively, on a comparative basis versus essentially the same adhesive but employing wholly uncovered plasticizers.

54.5 parts of 55 percent Borden Polyco 2188 emulsion and 127 parts of 55 percent Borden Polyco 2190 emulsion are added to a suitable vessel equipped with a stirrer. To this emulsion blend is added with stirring 65 parts of an aqueous SE10 dispersion which contains 50 percent solids (30 parts SE10) which have been individually covered with 2.5 parts Borden Polyco 2188 partcles (12:1 phase ratio) via either the salt coagulation procedure outlined in Example I or by the heat coagulation method outline in Example VII. Also added with stirring are 140 parts of a DPP-MHP aqueous dispersion which contains 50 percent solids (60 parts DPP, 10 parts MHP, and a very small amount of "Tamol-731" dispersing agent). 18.5 parts of water are then added to adjust the total solids of the formulation to 50 percent. This formulation is referred to as "A."

The same formulation as above was prepared again; however, neither the "SE10" nor any of the other components were provided with a covering of higher melting Polyco 2188 homopolymer particles. This formulation is referred to as "B."

Both of these formulations are similarly coated to give approximately equivalent coating weight on both "Mylar," a commercially available polyester, viz, polyethylene glycol terephthalate, and "Tyvek," a commercially available rubber treated paper product with high strength. ASTM blocking tests were run on the thus adhesively coated "Mylar" sheets to determine both adhesive to adhesive and adhesive to "Mylar" (AM) blocking.

TABLE 2

| Run | Percent covering latex, based on total latex | Parts "Polyco 2188" as individual covering | Parts "Polyco 2188" free | Parts "Polyco 2190" (all free) | Thermal activation (5 seconds at 95° C.) | Blocking at room temperature (68° F.), 10 p.s.i. AA | PA | Blocking at 105° F. (1 p.s.i.) AA | PA | Blocking at 140° F. (1 p.s.i.) AA | PA |
|---|---|---|---|---|---|---|---|---|---|---|---|
| 1 | 18.0 | 8.8 | 16.0 | 24.0 | Yes | No | No | No | No | Yes | Yes. |
| 2 | 21.1 | 5.0 | None | 18.75 | Yes | No | No | Yes | No | Yes | No. |
| 3 | 28.6 | 7.5 | do | 18.75 | Yes | No | No | Yes | No | Yes | Yes. |
| 4 | 28.6 | 5.0 | do | 12.5 | Yes | No | No | Yes | No | Yes | Yes. |
| 5 | 35.4 | 21.9 | 16.0 | 24.0 | Yes | No | No | Yes | No | Yes | No. |
| 6 | 36.4 | 5.0 | None | 8.75 | Yes | No | No | Yes | No | Yes | Yes. |
| 7 | 37.5 | 7.5 | do | 12.5 | Yes | No | No | Yes | No | Yes | Yes. |
| 8 | 40.0 | 12.5 | do | 18.75 | Slight | No | No | Yes | No | Yes | Yes. |
| 9 | 46.1 | 7.5 | do | 8.75 | do | No | No | Yes | No | Yes | Yes. |
| 10 | 59.2 | 12.5 | do | 8.75 | do | No | No | Yes | No | Yes | Yes. |

The blocking test results are indicated below in Table 3.

TABLE 3.—BLOCKING TESTS

| Formulation | 1 p.s.i. at 68° F. AA | AM | 1 p.s.i. at 105° F. AA | AM | 1 p.s.i. at 140° F. AA | AM |
|---|---|---|---|---|---|---|
| "A" | No | Free | No | No | Yet | Yes. |
| "B" | No | No | Yes | No | Yes | Yes. |

ASTM Peel Strength tests were run at 180° F. using formulations "A" and "B," respectively, to bond "Mylar" to "Mylar" and "Mylar" to "Tyvek." The bond strength test results reveal that no loss of bond strength accompanies the use of the adhesive "A" containing the covered plasticizer; yet as noted in Table 3, better blocking-resistance is attained.

What is claimed is:

1. Randomly shaped, particulate, blocking-resistant plasticizer solids each comprised of a normally cold flowable, thermally activatable, water-insoluble, tackifying plasticizer core having an about 0.02 to about 20 microns thick, substantially continuous, solid-retaining, comparatively hard individual covering comprised of polymeric material having a melting range the threshold temperature of which is higher than that of the thermal activation temperature of said tackifying plasticizer core, said individually covered plasticizer solids characterized by being nontacky at ambient temperatures due to the inhibition of the cold flowing tendency provided by said covering.

2. Blocking-resistant plasticizer solids as in claim 1 wherein the predominant shape of said randomly shaped solids is generally spherical.

3. Blocking-resistant plasticizer solids as in claim 1 wherein said individual covering contains bumpy projections of general rounded shape.

4. Blocking-resistant plasticizer solids as in claim 1 wherein the weight ratio of plasticizer core to higher melting covering material ranges from about 1.5 ot 20:1.

5. Blocking-resistant plastitizer solids as in claim 3 wherein said bumpy projections range in size from about 0.01 to about 1 micron.

6. Blocking-resistant plasticizer solids as in claim 1 wherein the plasticizer core is comprised of a mixture of plasticizers.

7. Blocking-resistant plasticizer solids as in claim 1 wherein said plasticizer core has a particle size less than about 50 microns.

8. A blocking-resistant, heat-sealable, thermoplastic adhesive composition comprising thermoplastic resin and from about 7 to about 25 weight percent, based on total thermoplastic adhesive including plasticizers, of individually covered; blocking-resistant plasticizer solids as in claim 1 uniformly distributed therein.

9. A blocking-resistant, heat-sealable, thermoplastic adhesive composition as in claim 8 which includes uncovered plasticizer sufficient to constitute a total plasticizer concentration up to about 33.3 weight percent, based on total adhesive including plasticizers.

10. A blocking-resistant, heat-sealable, thermoplastic adhesive composition as in claim 8 wherein the concentration of higher melting polymer including that providing said covering ranges from about 0.3 to about 18 weight percent, based on total adhesive including plasticizers.

11. A blocking-resistant, heat-sealable article comprising a substrate having secured thereto on one side a thermoplastic adhesive composition which is resistant to blocking at ambient temperatures comprising thermoplastic resin and uniformly distributed therein from about 7 to about 25 weight percent, based on total thermoplastic adhesive including plasticizers, of individually covered, blocking-resistant particulate plasticizer solids each comprised of a normally cold flowable, thermally activatable, water-insoluble, tackifying plasticizer core of particle size less than about 50 microns having an about 0.02 to about 20 microns thick, substantially continuous, solid-retaining, comparatively hard, individual covering comprised of water-insoluble polymeric material having a melting range the threshold temperature of which is higher than that of the thermal activation temperature of said plasticizer core to enable said plasticizer to egress upon thermal activation of said adhesive at thermal activation temperatures, said covering restricting access of said core plasticizer to said resin at temperatures below thermal activation temperatures thereby inhibiting the cold flowing tendency of said core plasticizer and enhancing the blocking-resistance of said adhesive.

12. An article as in claim 11 wherein the substrate is paper.

13. An article as in claim 12 wherein said paper has indicia on the nonadhesive side and said paper substrate is thermally strippable from a base due to said adhesive.

14. An article as in claim 11 wherein the substrate is washable wall covering material.

15. An article as in claim 11 wherein the substrate is metal foil.

16. An article as in claim 11 wherein the substrate is plastic.

17. An article as in claim 12 wherein the paper substrate is wallpaper ranging in weight from about 40 to about 90 pounds per 3000 ft.$^2$ ream and said adhesive is present in a concentration of from about 1 to about 50 pounds per ream.

18. A process for preparing blocking-resistant plasticizer solids comprising dispersing solid, water-insoluble, plasticizer core particles having a size less than about 50 microns in an aqueous latex of comparatively hard, higher melting, water-insoluble, particulate polymeric material having an average particle size ranging from about 0.5 to about 2 microns; coalescing the latex particles about said plasticizer cores to provide individual, higher melting, polymeric latex coverings for said plasticizer cores; and heating said covered plasticizer cores at a temperature ranging from about 40° C. to a maximum temperature below that at which said plasticizer core melts to enhance adhesion between said covering and said core thereby providing each said core particle with a substantially continuous, solid-retaining covering.

19. A process of making heat activable-prepasted wall covering which is resistant to blocking at ambient temperatures comprising depositing an aqueous dispersion containing from about 30 to about 60 weight percent adhesive solids of the adhesive composition of claim 8 on a wall covering substrate in a concentration of from about 1 to about 50 pounds of adhesive (dry basis) per 300 ft.$^2$ ream, and removing excess water.

20. A process as in claim 19 wherein said wall covering substrate is wallpaper.

21. A process as in claim 19 wherein said substrate is a washable wall covering comprised of cloth coated on its viewed side with flexible water-resistant plastic material.

22. Prewall covering decorative panelling comprised of a base panel having decorative wall covering material secured thereto by the adhesive of claim 8 thermally activated.

23. Decorative panelling as in claim 22 wherein said decorative wall covering is wallpaper.

24. Decorative panelling as in claim 22 wherein said decorative wall covering is a washable wall covering comprised of cloth coated on its viewed side with flexible, water-resistant plastic material.

References Cited

UNITED STATES PATENTS 2,613,191   10/1952   McGaffin   260—34.2
2,631,355   3/1963   Craig   117—27

WILLIAM J. VAN BALEN, Primary Examiner

U.S. Cl. X.R.

117—27, 29; 156—71, 283, 284; 161—168; 260—29.2, 34.2

UNITED STATES PATENT OFFICE
CERTIFICATE OF CORRECTION

Patent No. 3,558,418          Dated  January 26, 1971

Inventor(s)  Erland C. Porter, Jr. and Hans F. Huber

It is certified that error appears in the above-identified patent and that said Letters Patent are hereby corrected as shown below:

Column 2, line 1, after "threshold" insert -- ( --; line 19, "adhesive", second occurrence, should be plural. Column 3, line 19, "When" should be --While--. Column 4, line 44, "polphenyls" should be --polyphenyls--; line 58, "glycol monostearate" should be --glycerol monostearate--. Column 11, line 75, "from" should be --for--. Column 13, line 59, before "di-" insert -- ( --. Column 14, line 48, "adhesvie" should be --adhesive--. Claim 4, line 3, "ot" should be --to--. Claim 19, line 8, "300" should be --3000--.

Signed and sealed this 18th day of May 1971.

(SEAL)
Attest:

EDWARD M. FLETCHER, JR.          WILLIAM E. SCHUYLER,
Attesting Officer                Commissioner of Paten